(12) United States Patent
Jiang et al.

(10) Patent No.: US 12,409,479 B2
(45) Date of Patent: Sep. 9, 2025

(54) SELF-CLEANING DEVICE AND METHODS RELATING THERETO

(71) Applicant: UNIVERSITY OF NORTH TEXAS, Dallas, TX (US)

(72) Inventors: Yijie Jiang, Dallas, TX (US); Guanying Li, Dallas, TX (US); Gary Tejeda-Godinez, Dallas, TX (US)

(73) Assignee: UNIVERSITY OF NORTH TEXAS, Dallas, TX (US)

( * ) Notice: Subject to any disclaimer, the term of this patent is extended or adjusted under 35 U.S.C. 154(b) by 109 days.

(21) Appl. No.: 18/190,647

(22) Filed: Mar. 27, 2023

(65) Prior Publication Data

US 2023/0311174 A1 Oct. 5, 2023

Related U.S. Application Data

(60) Provisional application No. 63/326,409, filed on Apr. 1, 2022.

(51) Int. Cl.
| | |
|---|---|
| *B08B 17/06* | (2006.01) |
| *B08B 3/04* | (2006.01) |
| *C09D 1/00* | (2006.01) |
| *C09D 5/03* | (2006.01) |

(52) U.S. Cl.
CPC .............. *B08B 17/065* (2013.01); *B08B 3/04* (2013.01); *C09D 1/00* (2013.01); *C09D 5/032* (2013.01)

(58) Field of Classification Search
CPC ........... B08B 17/065; B08B 3/04; C09D 1/00; C09D 5/032
USPC ...................................................... 134/104.1
See application file for complete search history.

(56) References Cited

U.S. PATENT DOCUMENTS

2007/0031639 A1\* 2/2007 Hsu ........................... C23C 8/24
428/141
2019/0337013 A1\* 11/2019 Dadheech .............. B05D 3/107

OTHER PUBLICATIONS

Li, Guanying, et al., entitled, "3D printed self cleaning structured surfaces through capillary force," MRS Communications (2022) vol. 12, Issue 5, pp. 982-987, https://doi.org/10.1557/s43579-022-00286-2.

\* cited by examiner

*Primary Examiner* — Tinsae B Ayalew
(74) *Attorney, Agent, or Firm* — Andrew M. Metrailer; Conley Rose, P.C.

(57) ABSTRACT

A self-cleaning device and methods relating thereto can include a base, a plurality of channels formed in a first surface of the base, where the plurality of channels divide the first surface of the base into a plurality of sections, a plurality of cavities formed within the base, where each cavity of the plurality of cavities are disposed adjacent a corresponding section of the plurality of sections, and one or more capillary channels formed between the first surface of the base on the corresponding section and the corresponding cavity.

10 Claims, 5 Drawing Sheets

SELF-CLEANING DEVICE AND METHODS RELATING THERETO

CROSS-REFERENCES TO RELATED APPLICATIONS

This application claims the benefit of U.S. Provisional Application No. 63/326,409, filed on Apr. 1, 2022, and entitled "3D Printed Self-Cleaning Surfaces through Capillary Force," which is incorporated herein by reference in its entirety for all purposes.

STATEMENT REGARDING FEDERALLY SPONSORED RESEARCH OR DEVELOPMENT

None.

BACKGROUND

Surface self-cleaning technology can reduce the need for human labor and have health benefits in reducing the risk of bacterial spread. Different chemical and mechanical methods, such as photocatalysts continuously killing bacteria on the surfaces via chemical reactions, have been developed.

Generally, devices and apparatuses for fluid transfer can facilitate fluid movement. Often, as the fluid moves, particles entrained in the fluid can separate from the fluid and the particles may deposit on the surface of the device or apparatus. Cleaning is undertaken to remove the particles. There is a shortcoming of requiring an active cleaning step rather than such a device or apparatus being self-cleaning, thereby improving efficiency.

SUMMARY

In some embodiments, a self-cleaning device comprises: a base; a plurality of channels formed in a first surface of the base, wherein the plurality of channels divide the first surface of the base into a plurality of sections; a plurality of cavities formed within the base, where each cavity of the plurality of cavities are disposed adjacent a corresponding section of the plurality of sections; and one or more capillary channels formed between the first surface of the base on the corresponding section and the corresponding cavity.

In some embodiments, a method of cleaning a surface comprises: contacting a first surface of a base of a device with an aqueous fluid, wherein the device comprises: the base; a plurality of channels formed in the first surface of the base, wherein the plurality of channels divide the first surface of the base into a plurality of sections; a plurality of cavities formed within the base, where each cavity of the plurality of cavities are disposed adjacent a corresponding section of the plurality of sections; and one or more capillary channels formed between the first surface of the base on the corresponding section and the corresponding cavity; passing the aqueous fluid into the plurality of channels using capillary force; passing the aqueous fluid from the plurality of channels to the plurality of cavities; and carrying at least one contaminant from the first surface to the plurality of cavities with the aqueous fluid.

In some embodiments, a self-cleaning device comprises: a hydrophobic surface; an internal chamber in fluid communication with the hydrophobic surface for collecting a fluid comprising one or more particles therein; and at least one capillary for communicating the internal chamber with the hydrophobic surface for the fluid to travel from the internal chamber to the hydrophobic surface while substantially all the one or more particles remain in the internal chamber.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Instead of relying on chemical reactions, capillary force can be used as the mechanism to drive fluid to automatically clean the surfaces. In some embodiments, a 3D printed flexible, self-cleaning surface with texture and internal micro-channels can effectively serve as self-cleaning devices. The texture may aid the surfaces' hydrophobicity and reduce the surface tension to allow water and disinfectant flow that can transport particles or bacteria off the surface. Next, the internal micro-channels may drive the contaminated fluid underneath the surface via capillary force. Generally, the texture and channel dimension designs are performed based on theoretical analysis of capillary force and experimental measurements. Generally, microparticle contamination tests indicate that the 3D printed designed samples can have a significant improvement in self-cleaning efficiency.

Figure 1:
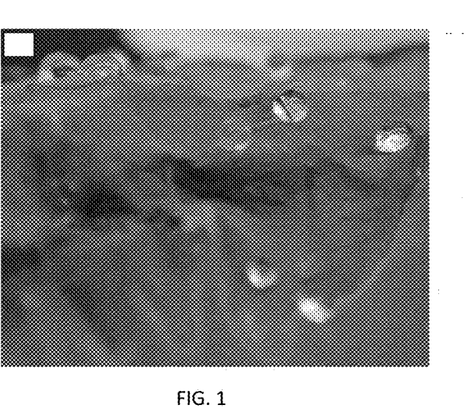
FIG. 1 is a schematic depiction of contact angles of water droplets on a lotus leaf depicting different contact angles due to different local textures affecting the contact angle between the leaf and water.

Surface texture, defined as roughness and particle shape, influences the contact angle. In the case of water, when the angle is greater than or equal to about 90°, the surface can be considered hydrophobic, and the surface can be considered hydrophilic if the angle is less than about 90°. The hydrophobic ability of a surface increases as the roughness of the surface increases. The hydrophobicity of the surface causes the self-cleaning effect, which occurs when the adhesion force and contact area of the contact surface decrease. Because the contact area can be reduced by dirt on the surface, the droplets typically roll off with the dirt. In nature, the lotus leaf can have a contact angle more than about 150°, as shown in FIG. 1. The rough structure as well as the wax, which can include non-polar methyl groups, may influence the hydrophobicity and self-cleaning effect.

In some embodiments, instead of obtaining perfect hydrophobicity, a designed structure approximates a hydrophobic state so that water can slowly push particles into side channels. While the surface may be hydrophobic due to the surface features and structures, the remainder of the structure may not be hydrophobic. Rather, the material may be hydrophilic such that the water repelled off of the hydrophobic surface may be received by the channels, holes, and capillaries (e.g., with one or more being formed from a hydrophilic material).

Figure 2:
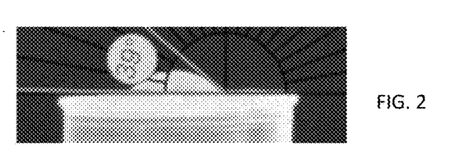
FIG. 2 is a schematic depiction of a contact angle measurement of a water droplet on a plane surface.
Figure 3:
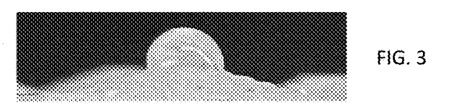
FIG. 3 is a schematic depiction of an embodiment of a contact angle of a water droplet of a three-dimensional (3D) printed textured surface.

In some embodiments, a device is disclosed herein that can comprise a self-cleaning surface with a structure including an exterior textured hydrophobic surface associated with internal capillary-driven microstructures underneath as a contamination transportation system, instead of using a surface with super-hydrophobicity. The design may be 3D printed as a flexible and stretchable structured film and have self-cleaning efficiency. In some embodiments, a fingerprint-like surface texture with microstep-generated local slopes can increase the contact angle of water and alcohol to effectively wash off contaminated droplets into the internal structures beneath the surface. As an example, the designed texture can increase the contact angle for water from about 35±8° to about 85±10°, or from about 37.8±5.03° to 87.5±2.5°, which may allow the water to progressively displace particles into the side channels by approaching a hydrophobic state. This effect is shown in FIGS. 1-3. The textured-surface can increase the contact angle to 34.5±1° for alcohol, which is depicted as wetting a planar smooth surface in FIG. 4. Capillary action through internal micro-channels can drive the continuous flow to complete the self-cleaning processes, while leaving the contaminants stored in one or more internal chambers. By water exposure tests, the effective transportation of surface contaminants into internal chambers can have up to about 85%, up to about 80%, or up to about 78% self-cleaning efficiency as measured for undeformed samples as well as bent and stretched surfaces. The self-cleaning functionality and the flexibility of the structured surface may have applications in coatings, building parts, household usage, and the food and medical industry.

Figure 4:
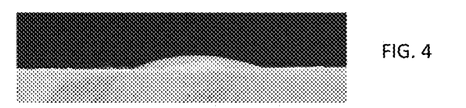
FIG. 4 is a schematic depiction of a contact angle of an alcohol droplet of a plane surface.

Referring to FIGS. 1-4, several contact angle measurements are depicted. Water droplets on a lotus leaf depicting different contact angles due to different local textures and the contact angle between water and leaf. A planar surface with a contact angle of 39° is depicted in FIG. 2. A 3D printed textured surface with an increased contact angle is depicted in FIG. 3. As depicted in FIG. 4, a contact angle between alcohol and a planar surface is shown.

Figure 5:
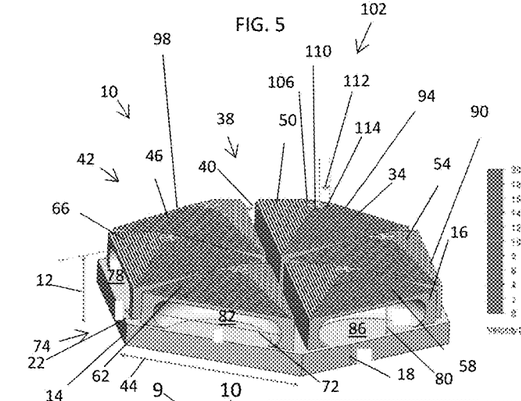
FIG. 5 is a schematic depiction of an embodiment of a hexagonal self-cleaning device.
Figure 6:
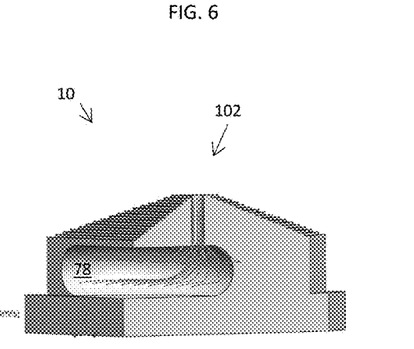
FIG. 6 is a schematic depiction of an embodiment of a water flow simulation of the hexagonal self-cleaning device.
Figure 7:
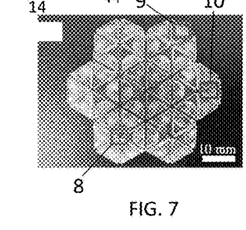
FIG. 7 is a schematic depiction of an embodiment of a 3D printed self-cleaning device, and optical microscopy observations of its features.
Figure 8:
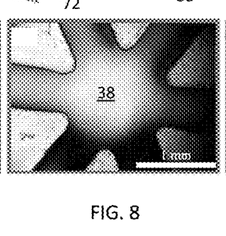
FIG. 8 is a depiction of enlarged area "8" of FIG. 7 of side channels.
Figure 9:
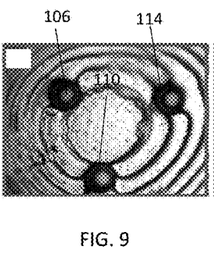
FIG. 9 is a depiction of enlarged area "9" of FIG. 7 of outlets of internal channels allowing liquid evaporation.
Figure 10:
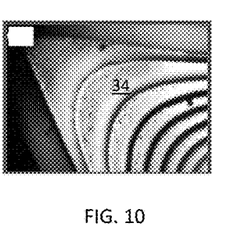
FIG. 10 is a depiction of enlarged area "10" of FIG. 7 of a transition from fingerprint-like texture to side channels.

Referring to FIGS. 5-10, an embodiment of a design and features of self-cleaning surfaces are depicted. As depicted in FIG. 5, a schematic of a hexagonal unit and key dimensions are shown. A water flow simulation of a self-cleaning surface subunit is depicted in FIG. 6. A 3D printed sample and optical microscopy observations of the features of the sample are shown, as depicted in FIG. 7. Enlarged portions of FIG. 7 include side channels serving as liquid guides, as depicted in FIG. 8, outlets of internal channels allowing liquid evaporation, as depicted in FIG. 9, and transition from fingerprint-like texture to side channels, as depicted in FIG. 10.

Although a single 3D printer may have difficulty printing immense structures, a componential module may be printed and subsequently repeated and merged with other modules to create the larger texture surface in a device. For the componential module, in some embodiments each hexagonal unit can consist of six components, as depicted in FIG. 5. Each component can include a single triangular prism with three microchannels, as depicted in FIG. 9, where liquid evaporation outlets of the internal channels communicate with one internal chamber. Textured or bumpy structures can be used to generate the slope, to facilitate hydrophobic characteristics that may imitate a lotus leaf's self-cleaning abilities.

Referring to FIG. 5, a self-cleaning device 10 can include a plurality of subunits or sections 42, such as a first section 46, a second section 50, a third section 54, a fourth section 58, a fifth section 62, and a sixth section 66 and a plurality of channels 38. Although six sections are depicted, any suitable number of sections can be included in the self-cleaning device 10. The plurality of channels 38 can segregate each of the plurality of sections 42. Each of the plurality of sections 42 can form a triangular prism subunit, such as a triangular prism subunit 16 for the fourth section 58 and have a first surface, similarly to a first surface 34 of the second section 50. The first surface 34 can include a textured surface optionally with one or more steps or a fingerprint pattern to provide a hydrophobic surface. Each of the plurality of sections 42 can include a cavity, namely a plurality of cavities or internal chambers 74, namely a first cavity 78, a second cavity 82, a third cavity 86, a fourth cavity 90, a fifth cavity 94, and a sixth cavity 98. Each of the plurality of sections 42 may have one or more capillary channels 102, namely a first capillary or capillary channel 106, a second capillary channel 110, and a third capillary channel 114. formed between the first surface 34 of the corresponding section 50 and cavity 94.

More particularly in FIG. 5, the self-cleaning device 10 can have a diameter 112 of a microchannel 114, a total height 12 of one single unit of a self-cleaning device 10, a width 40 of the side channel 38 serving as a liquid guide as depicted in FIG. 8, a height 18 of the single unit base 14, a width 72 of an internal chamber or second cavity 82, a height 80 of a triangular prism subunit 16, a width 22 between the edge of the section 66 and hexagonal unit or base 14, and a length 44 of the hexagonal unit corresponding to section 62. In some aspects, a microchannel 114 and bump can have the same height.

Although not wanting to be bound by theory, several tests can be made to select a channel height. In some embodiments, a vertex of about 1.2 mm can be found to be too shallow, while a vertex of about 1.3 mm and about 1.4 mm can be found to be too sharp. In some embodiments, a vertex between about 1.2 to about 1.3 or between about 1.22 to about 1.28 mm, or about 1.25 mm can be suitable as a suitable option between too shallow and too sharp, hence the channel may have a height within the ranges noted above.

In some aspects, the height and channel diameter can be determined via Jurin's Law:

$$h_c = \frac{2\gamma \cos\theta}{\rho g r_0}$$

where $h_c$ is the liquid height; $\gamma$ is the surface tension of water; $\theta$ is the contact angle of the water on the tube wall; $\rho$ is the mass density of water; $r_0$ is the channel radius; and g is the gravitational acceleration. In some embodiments, the channel can have a diameter 112 between about 100 to about 1,000 micron (μm), between about 250 to about 750 or about 350 μm. A total height 12 can be between about 1 to about 10 millimeter (mm), between about 2 to about 7 mm, or between about 3.75 mm, and a height 80 can be between about 0.1 to about 10 mm, between about 0.5 to about 5 mm, or about 1.5 mm.

The diameter 112 of the channel 114 can have an influence on height. The theoretical calculation of outflow of fluid using Jurin's Law may be used to determine the channel diameter, including overcompensating for the shortness of the design to ensure that the fluid can flow out of the tube during actual implementation. In some aspects, the height 18 of the single unit base 14 can be between about 0.1 and about 5 mm, between about 3 and about 5 mm, or about 1 mm to compress the structure in order to be applied superficially to any object or surface. To drain out the resin from the microtubules, a cavity 82 having a width 72 of between about 1 to about 10 mm, between about 4 to about 8 mm, or about 5.8 mm can be cut straight through the side and connected to vertical tubules through a much larger cavity. The length 44 can be between about 1 to about 15 mm, between about 5 to about 10 mm, or about 8.37 mm of one hexagonal unit 62 and the width 40 can be between about 100 to about 1,000 between about 300 μm to about 800 or about 640 μm of the side channel 38, which can allow the 3D printed textured surface to be large enough to generate the internal structures and form a usable surface area when six singular triangular prism subunits 46, 50, 54, 58, 62, and 66 are combined into a unit or a self-cleaning device 10. Moreover, to allow the width of side channels between neighboring subunits to be the same, the width between the edge 22 of the subunit and hexagonal unit can be about half of the width of side channel 40. As a result, the edge 22 can be between about 100 to about 500 or about 320 μm in some embodiments. Each of the plurality of channels 38 can have a height in a range of between about 0.1 to about 5 mm, between about 1 and about 2 mm, or between about 1.2 and about 1.4 mm, and a diameter of each of the plurality of channels 38 can be between about 0.1 and about 0.4 mm, or about 2.5 mm.

In some embodiments, a device may repeat seven single units 10, as depicted in FIG. 7. Additional units 10 can be added to produce larger surfaces or structures having a variety of shapes. Each bump of the self-cleaning surface can have a fingerprint-like texture as visible under a five-times magnification with an optical microscope, as depicted in FIG. 10. In some embodiments, the 3D model does not include a fingerprint-like texture as stereolithography (SLA) 3D printing technology is employed, which can generate samples layer-by-layer. As a result, instead of a smooth surface on a slope, a fingerprint-like texture, as depicted in FIG. 10, can transition from fingerprint-like texture to side channels.

In some embodiments, the self-cleaning procedure may depend on the hydrophobicity to remove at least one of dirt and germs such as bacteria and the capillary action to achieve self-cleaning circulation. Because of the diameter of the channel and the adhesive and cohesive forces between the liquid and the surface, capillary action can occur in microchannels.

Figure 11:
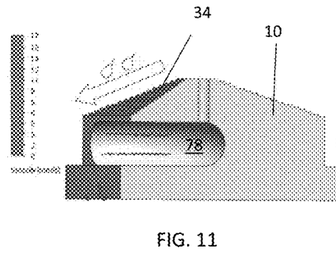
FIGS. 11-13 are schematic depictions of an embodiment of a self-cleaning process of a contaminated liquid flowing on the hydrophobic textured surfaces, falling into the side channels, entering into the internal chambers, and drawing up along vertical microchannels due to a capillary force and evaporates, leaving contaminations in the internal chambers.
Figures 12, 13:
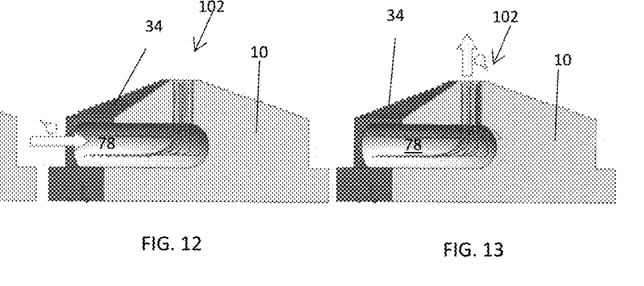

Referring to FIGS. 11-13, a self-cleaning process can comprise a contaminated liquid flow on the hydrophobic textured surfaces, as depicted in FIG. 11, the contaminated liquid flow may be guided into the side channels, as depicted in FIG. 12, and the contaminated liquid flow may arrive into the internal chambers, as depicted in FIG. 13. Afterwards, the liquid may be drawn up along vertical microchannels due to the capillary force and evaporate, leaving contaminates in the internal chambers. In some embodiments, the unit 10 self-cleaning operation can proceed with liquid initially flowing on the surface, as depicted in FIG. 11. Afterwards, the liquid may be guided into the side channels, and then flow out of the side channels and into the internal chambers, as depicted in FIG. 12. The capillary force may draw up fluids into internal channels, as depicted in FIG. 13, and out of the channel outlet, re-covering the surface, as depicted in FIG. 11. The dirt can be washed away with the water circulation in this procedure, and a self-cleaning action can be achieved.

Figure 15:
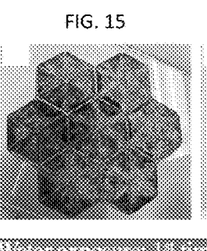
Figure 16:
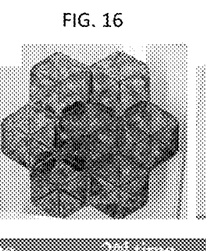
Figure 17:
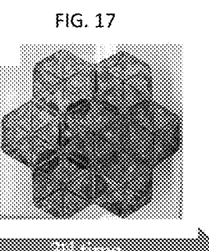
Figure 19:
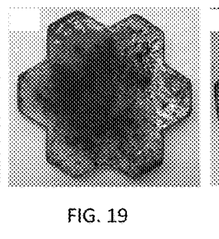
Figure 20:
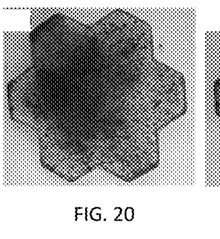
Figure 21:
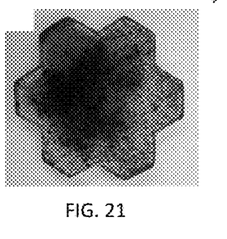
Figure 22:
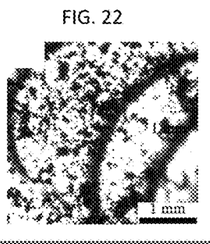
FIGS. 22-25 are schematic depictions of an embodiment of a self-cleaning effect of a contaminated structured surface under five times magnification with an optical microscope after water exposure for a first time, a second time, and a third time.
Figure 23:
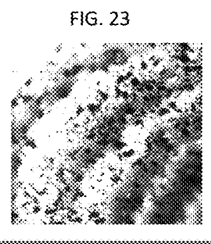
Figure 24:
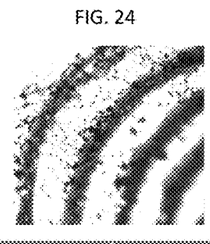
Figure 25:
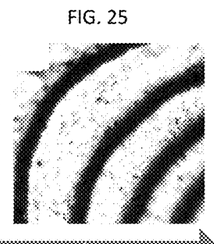
Figure 26:
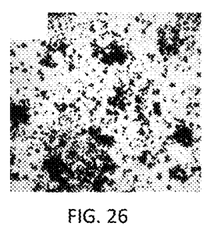
FIGS. 26-29 are schematic depictions of a self-cleaning effect of a contaminated plane surface under five times magnification with an optical microscope after water exposure for a first time, a second time, and a third time.

Referring to FIGS. 14-21, a comparison of self-cleaning effect of a structured surface and a planar surface are shown. As depicted in FIGS. 14-17, the contaminated structured surface and the appearance after water exposure for a first time (FIG. 15), a second time (FIG. 16), and a third time (FIG. 17). As depicted in FIGS. 18-21, a contaminated plane surface and the appearance after water exposure for a first time (FIG. 19), a second time (FIG. 20), and a third time (FIG. 21).

Referring to FIGS. 22-29, a comparison of self-cleaning effect of a structured surface and a planar surface under five times magnification with an optical microscope is depicted. Referring to FIGS. 22-25, the contaminated structured surface and the appearance after water exposure for a first time, a second time, and a third time are shown, and a contaminated planar surface and the appearance after water exposure for a first time, a second time, and a third time are shown for comparison.

Figure 27:
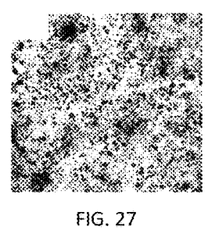
Figure 28:
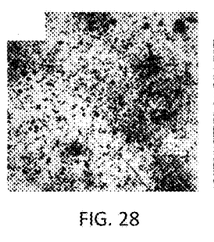
Figure 29:
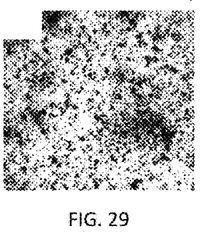

The self-cleaning effect of a structured surface and a plane surface are compared under five times magnification with an optical microscope. As the time of the water exposure increases, the number of contaminants (shown as black spots on the microscope) decreases for the textured surface, as depicted in FIGS. 22-25, and remains almost constant for the planar surface, as depicted in FIGS. 26-29. In both macroscope and microscope views of the planar surface, the number of $MnO_2$ microparticles as represented by the microparticle greyscale images, after contaminating, as depicted in respectively in FIGS. 18 and 26, appear less than the first-time water exposure, as depicted in FIGS. 19 and 27. Although not wanting to be bound by theory, the reason for this phenomenon is the flow of water disperses the collected $MnO_2$ microparticles and amplifies their distribution.

In some embodiments, a single self-cleaning surface unit can be reproduced and have a large number of surfaces. The contact angle of water on the self-cleaning surface can be about 30° to about 75°, which can allow the water to progressively displace particles into the side channels by approaching a hydrophobic state. The capillary action of liquid can be achieved by the microchannels inside the bumps of each textured unit, which can realize the self-cleaning process based on circulation of a fluid in contact with the surface. During the exposure to a fluid such as water, a decrease in contaminants due to the dilution and entrainment of the contaminants on the self-cleaning texture surface may be observed. In contrast, the amount of contaminants on a similarly sized planar or flat surface is basically unaffected. As a result, by self-cleaning, this type of self-cleaning surface may eliminate impurities such as dirt, bacteria, and toxics. In some embodiments, the self-cleaning surface has remarkable practicability due to the low cost of materials as well as high efficiency of production and wide impact in the different fields and application, such as medicine, aerospace, construction, and smart devices.

In some aspects, the self-cleaning unit can be made from a flexible material that can allow the unit(s) to stretch or be bent. For example, the self-cleaning unit can be stretched up to about 25% in one or two dimensions and still demonstrate a self-cleaning ability. In some aspects, the material can be bent and still retain a self-cleaning ability. When stretched or bent, the fingerprint-like texture-induced hydrophobicity and the slope can drive contaminants to roll off the surface and into side channels. With water flowing into the inner chamber, the microparticles can be retained by the capillary force of the microchannels. The water can evaporate through the outlets of the microchannels, and as a result, microparticles can be retained and accumulated in the internal chamber during the self-cleaning process. The distribution of microparticles at the bottom of the internal chamber may be at a much higher concentration as compared to the exterior of the textured surfaces.

In some aspects, the self-cleaning surfaces can have a cleaning efficiency improvement relative to a planar surface having the same or similar geometry but without the textured surface or channels. A normalized cleaning efficiency can be defined as the amount of contaminants removed after one or more cleaning cycles as described herein relative to the initial amount of contaminants present, expressed as a percentage. In some aspects, the self-cleaning surface can have a normalized cleaning efficiency of up to 50%, up to 60%, up to 70%, or up to 80%. The normalized cleaning efficiency can be achieved even with bent or stretched surfaces. This self-cleaning efficiency can be compared to the cleaning ability of a planar surface which can be less than about 10-15%, so that the use of the features described herein can significantly improve the cleaning capabilities of the surface.

In some aspects, the self-cleaning unit can provide self-cleaning for inorganic or organic contaminants. Organic contaminants can include bacterial contamination of surfaces. The ability to self-clean the surface can depend on the type of fluid used to clean the surface. For example, water or similar aqueous fluids may be used for some inorganic contaminants while an organic solvent such as an alcohol may be used for an organic contaminant such as bacteria. The ability to provide self-cleaning for both inorganic and organic contaminants demonstrates the usefulness of the structural features as described herein.

In summary, a structured surface with a self-cleaning function can be achieved by harnessing the texture-induced surface hydrophobicity and capillary force-driven mechanisms. A fingerprint-like texture can be used on the surface to substantially increase the contact angle of liquid and allowed effective transportation of microparticles into the internal structures beneath the exterior surface. The capillary action can occur in internal microchannels and drive the liquid from underneath and actualize the self-cleaning processes. In water exposure tests, a significant decrease in surface contamination can be achieved. Under various loading conditions, the self-cleaning surfaces can achieve up to about 80% self-cleaning efficiency within three cycles of water exposures without additional efforts, such as wiping, blowing air, or consumption of chemicals, applied to the surface. The self-cleaning functionality can efficiently eliminate impurities such as dirt, bacteria, and toxics from surfaces and have potential applications in coatings, medicine, and public building constructions.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Example 1—Comparison of Self-Cleaning Surface and Planar Surface

Figure 14:
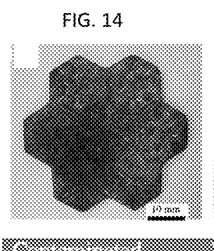
FIGS. 14-17 are schematic depictions of an embodiment of a structured surface with a contaminated structured surface and after water exposure for a first time, a second time, and a third time.
Figure 18:
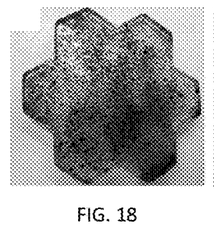
FIGS. 18-21 are schematic depictions of a plane surface with a contaminated structured surface and after water exposure for a first time, a second time, and a third time.

The 3D printed texture model can include a plurality of substantially similar or identical hexagonal single units where each unit can be printed sequentially and then arranged to form a larger structure as shown in the images in FIGS. 14-17 with comparative planar surfaces shown in FIGS. 18-21. As shown, manganese oxide ($MnO_2$) microparticle having a mass of about 0.25 g were uniformly covered on the surface of the 3D printed self-cleaning surface, as depicted in FIG. 14. Next, deionized (DI) water of five milliliter (ml) is dripped evenly on the contaminated surface and exposed for 5 minutes, as depicted in FIG. 15. The above procedure was repeated two more times, as a second time water exposure, as depicted in FIG. 16, and the third time water exposure, as depicted in FIG. 17. The $MnO_2$ microparticle concentration on the surface decreased with the water exposure as shown over time by increasing the dilution of the black color, as by sequentially comparing the FIGS. 14-17. In contrast, the control group with a planar surface that is also combined by seven repeat single hexagonal single units and has the same size (length of one plane hexagonal unit is 8.37 mm) as the textured units. Applying the same mass of contaminants $MnO_2$ microparticle of about 0.25 gram (g), as depicted in FIG. 18. After the three times five ml of five minutes water exposure, the contaminants on the plane surface does not exhibit obvious change, as depicted in FIGS. 19-21.

Example 2—Stretch and Elongation Tests

To compare the self-cleaning effects under different mechanical force actions, in some embodiments, water exposure tests can be performed on stretched elongation of about 21.5% and bended (radius of curvature of about 9.32 mm) specimens, as depicted in FIGS. 30-45. The same amount of contamination and water exposure tests can be conducted on the stretched and bended structured surfaces, as described above in Example 1. With each water exposure, contaminants on the stretched structured surface can be effectively reduced. Both the stretched and the bended structured surfaces under the five times magnification with an optical microscope are shown, respectively, in FIGS. 34-37 and FIGS. 42-45.

Figure 30:
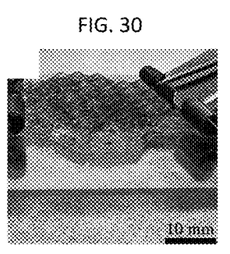
FIGS. 30-33 are schematic depictions of an embodiment of a self-cleaning effect of a contaminated stretched structured surface after water exposure for a first time, a second time, and a third time.
Figure 31:
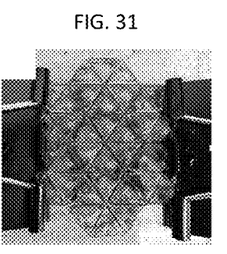
Figure 32:
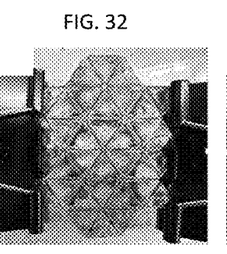
Figure 33:
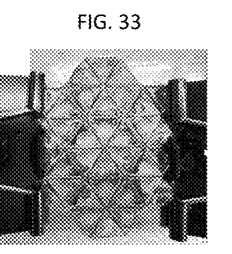
Figure 34:
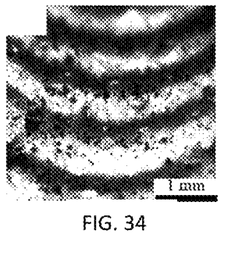
FIGS. 34-37 are schematic depictions of an embodiment of a self-cleaning effect of a contaminated stretched structured surface under five times magnification with an optical microscope after water exposure for a first time, a second time, and a third time.
Figure 35:
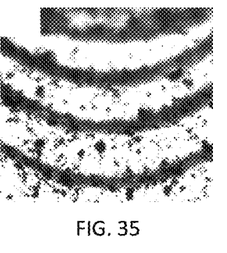
Figure 36:
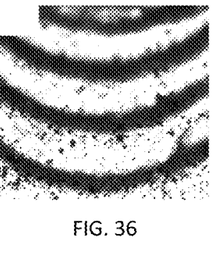
Figure 37:
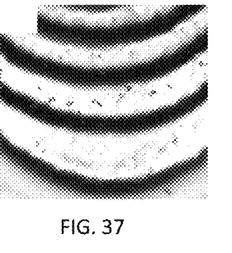

Referring FIGS. 30-37, a self-cleaning effect of a stretched structured surface is shown. The contaminated structured surface as depicted in FIG. 30 and the appearance after water exposure for a first time, a second time, and a third time, as depicted in FIGS. 31-33, and a contaminated structured surface, as depicted in FIG. 34, and the appearance under five times magnification with an optical microscope after water exposure for a first time, a second time, and a third time, as depicted in FIGS. 35-37. As depicted, the self-cleaning effect is present when stretched.

Figure 38:
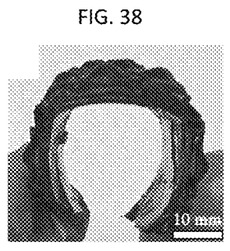
FIGS. 38-41 are schematic depictions of an embodiment of a self-cleaning effect of a contaminated bended structured surface after water exposure for a first time, a second time, and a third time.
Figure 39:
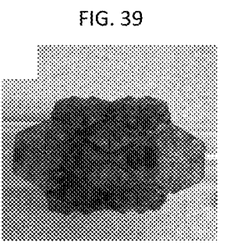
Figure 40:
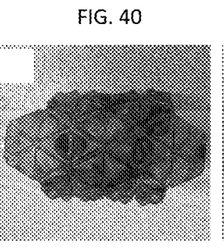
Figure 41:
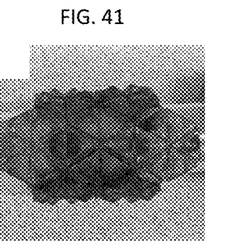
Figure 42:
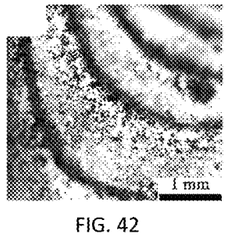
FIGS. 42-45 are schematic depictions of an embodiment of a self-cleaning effect of a contaminated bended structured surface under five times magnification with an optical microscope after water exposure for a first time, a second time, and a third time.
Figure 43:
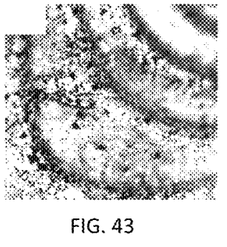
Figure 44:
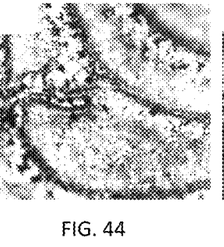
Figure 45:
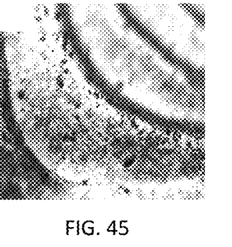
Figure 46:
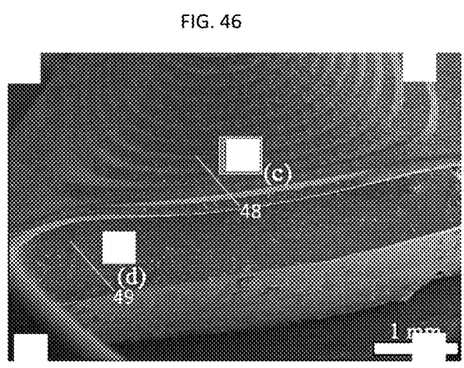
FIGS. 46-47 are schematic depictions of an embodiment of contaminant distribution after one cycle of water exposure with a 3D-printed device at the viewpoint of the exterior surface and entrance of the chamber and fingerprint-like surface texture and distribution of microparticles, where the arrows indicate liquid flow direction on the fingerprint-like surface

Referring to FIGS. 38-45, a self-cleaning effect of a bended structured surface is shown. The contaminated structured surface as depicted in FIG. 38 and the appearance after water exposure for a first time, a second time, and a third time, as depicted in FIGS. 39-41, and a contaminated structured surface, as depicted in FIG. 42, and the appearance under a five times magnification in an optical microscope after water exposure for a first time, a second time, and a third time. As depicted, the self-cleaning effect is present when bent.

Figure 47:
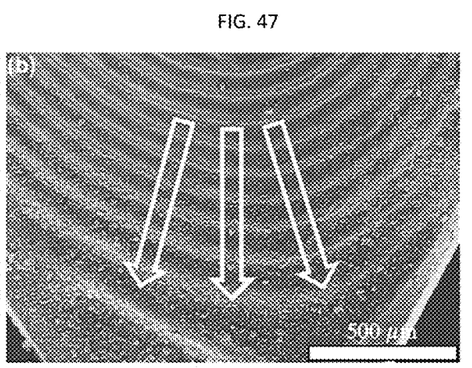
Figure 48:
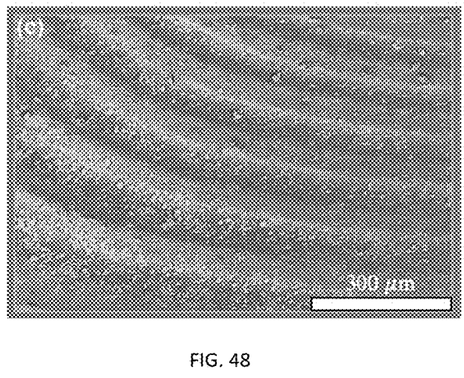
FIG. 48 is a depiction of enlarged area "48" of FIG. 46 of an exterior surface with fingerprint-like surface texture.
Figure 49:
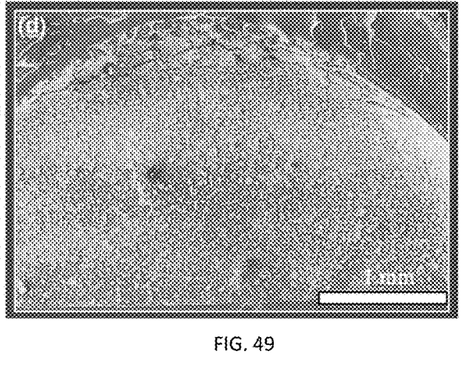
FIG. 49 is a depiction of enlarged area "49" of FIG. 46 of an entrance of the chamber.

Furthermore, scanning electron microscopy (SEM) images are taken to observe the contamination (highlighted by grey color) cleaning results after first cycle as seen in FIGS. 46-49. The fingerprint-like texture-induced hydrophobicity and the slope can drive contaminants to roll off the surface and into side channels. Hence, a small amount of contaminants may aggregate around the edges of subunits, as depicted in FIGS. 47-48. With water flowing into the inner chamber, the microparticles are retained by the capillary force of the microchannels. Next, water can evaporate through the outlets of the microchannels. As a result, microparticles can be retained and accumulated in the internal chamber during the self-cleaning process. The distribution of microparticles at the bottom of the internal chamber may be at a much higher concentration as compared to the exterior of the textured surfaces, as depicted in FIGS. 48-49.

Referring to FIGS. 46-49, SEM images of contaminants can be distributed after one cycle of water exposure. A 3D-printed unit sample at the viewpoint of the exterior surface and entrance of the chamber, a fingerprint-like surface texture and distribution of microparticles (highlighted by orange color), where the arrows indicate liquid flow direction on the fingerprint-like surface, and a cross-section view of internal chamber with a large amount of contaminated particles stored are shown.

Example 3—Cleaning Efficiency

Figure 50:
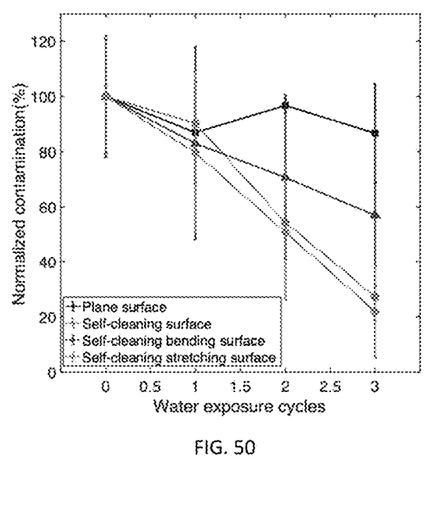
FIG. 50 is a graphical depiction of normalized contamination versus water exposure cycles of a plane surface and several embodiments of a surface.
Figure 51:
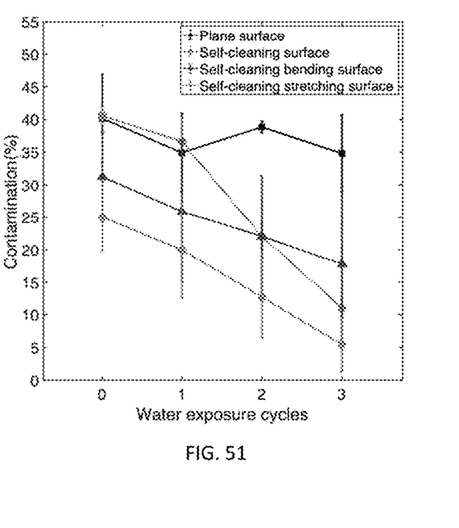
FIG. 51 is a graphical depiction of normalized contamination versus water exposure cycles of a plane surface and several embodiments of a surface.

Referring to FIGS. 50-51, the surface contamination percentage as a function of water exposure cycle for normalized contamination as a function of water exposure cycles and contamination percentage as a function of water exposure cycles.

To compare the self-cleaning process more accurately, the difference percentage between each step may be performed with a pixelated analysis on the microscopy images for the plane surface as well as undeformed, bended, and stretched self-cleaning surfaces, as depicted in FIGS. 50 and 51. The normalized efficiency with water exposure cycles is plotted as depicted in FIG. 50. In each case, the contamination percentages are normalized by its own cycle zero value (before water exposure). The results show that the designed self-cleaning structured surfaces have a significant improvement in self-cleaning function and an efficiency up to about 78.3%. Although the self-cleaning efficiency varied under the actions of different mechanical deformations, the self-cleaning effect outperformed the plane surface case significantly. By identifying the contaminated portions from the images, the percentages of contaminants as a function of water exposure cycles are as depicted in FIG. 51. The contamination percentages of the plane surface can vary in a narrow range, while the contamination on the undeformed, bended, and stretched self-cleaning surfaces may decrease substantially and monotonically with water exposure cycles.

Example 4—Bacterial Removal

Figure 52:
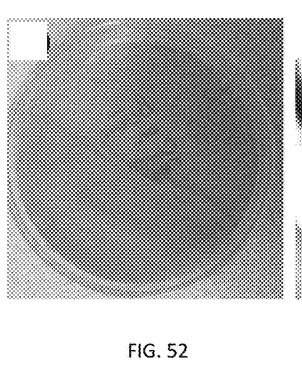
FIGS. 52-54 are schematic depictions of an embodiment of the self-cleaning effects of *E. coli* contaminated structured surface with a culture of *E. coli* for surface contamination and self-cleaning tests, the *E. coli* contaminated structured surface and the appearance under five times magnification with an optical microscope, and after exposure for the third time under five times magnification with an optical microscope.
Figure 53:
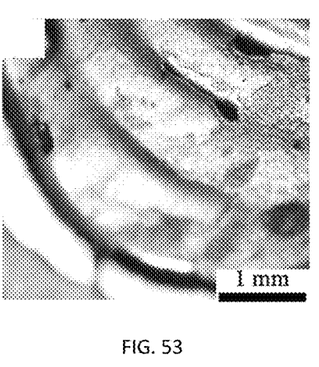
Figure 54:
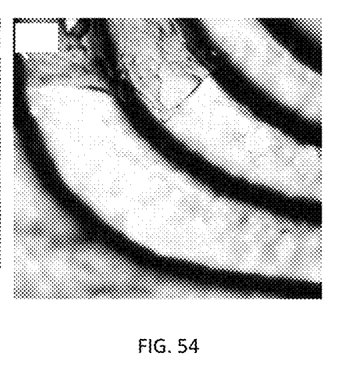

Referring to FIGS. 52-54, self-cleaning effects of *E. coli* contaminated structured surface are shown. Particularly, a culture of *E. coli* for surface contamination and self-cleaning tests, the *E. coli* contaminated structured surface, and the appearance under five times magnification with an optical microscope and after exposure for the third time.

In addition to inorganic contaminations (e.g. the microparticles), in some embodiments self-cleaning tests on *E. coli* contaminated surfaces may be undertaken. An alcohol-based disinfectant can be used to evaluate the effectiveness of a self-cleaning process. To perform the self-cleaning tests, *E. coli* can be cultured by agar petri plate, as depicted in FIG. 52. An inoculation loop can be used to dip an appropriate amount of *E. coli* specimen from the agar petri plate surface and evenly smear them on the 3D printed self-cleaning sample, as depicted in FIG. 53. A decrease in *E. coli* level after three times alcohol-based disinfectant exposure using the same procedure as described above can be observed, as depicted in FIG. 54.

Additional advantages may be apparent to one of skill in the art viewing this disclosure. Having described various systems and methods herein, certain embodiments can include, but are not limited to:

In a first aspect, a self-cleaning device comprises: a base; a plurality of channels formed in a first surface of the base, wherein the plurality of channels divide the first surface of the base into a plurality of sections; a plurality of cavities formed within the base, where each cavity of the plurality of cavities are disposed adjacent a corresponding section of the plurality of sections; and one or more capillary channels formed between the first surface of the base on the corresponding section and a corresponding cavity.

A second aspect can include the self-cleaning device of the first aspect, wherein a surface of each section comprises a textured surface.

A third aspect can include the self-cleaning device of the first or second aspect, wherein a surface of each section is hydrophobic.

A fourth aspect can include the self-cleaning device of any of the preceding aspects, wherein each of the plurality of channels has a height in a range of between about 1 and about 2 mm, or between about 1.2 and about 1.4 mm.

A fifth aspect can include the self-cleaning device of any of the preceding aspects, wherein a diameter of each of the plurality of channels is between about 0.1 and about 0.4 mm.

A sixth aspect can include the self-cleaning device of any of the preceding aspects, wherein a height of the base is between about 3 and about 5 mm.

A seventh aspect can include the self-cleaning device of any of the preceding aspects, wherein the base is formed from a hydrophilic material.

An eighth aspect can include the self-cleaning device of any of the preceding aspects, wherein the self-cleaning device is 3D printed.

In a ninth aspect, a method of cleaning a surface, the method comprises: contacting a first surface of a base of a device with an aqueous fluid, wherein the device comprises: the base; a plurality of channels formed in the first surface of the base, wherein the plurality of channels divide the first surface of the base into a plurality of sections; a plurality of cavities formed within the base, where each cavity of the plurality of cavities are disposed adjacent a corresponding section of the plurality of sections; and one or more capillary channels formed between the first surface of the base on the corresponding section and a corresponding cavity; passing the aqueous fluid into the plurality of channels using capillary force; passing the aqueous fluid from the plurality of channels to the plurality of cavities; and carrying at least one contaminant from the first surface to the plurality of cavities with the aqueous fluid.

A tenth aspect can include a method of cleaning a surface of the ninth aspect, further comprising: passing the aqueous fluid from the plurality of cavities to the first surface through the one or more capillary channels.

An eleventh aspect can include a method of cleaning a surface of the ninth or tenth aspect, wherein the surface of each section comprises a textured surface.

A twelfth aspect can include a method of cleaning a surface of any of the ninth aspect to the eleventh aspect, wherein the surface of each section is hydrophobic.

A thirteenth aspect can include a method of cleaning a surface of any of the ninth aspect to the twelfth aspect, wherein the plurality of channels have a height in a range of between about 1 and about 2 mm, or between about 1.2 and about 1.4 mm.

A fourteenth aspect can include a method of cleaning a surface of any of the ninth aspect to the thirteenth aspect, wherein a diameter of a channel is between about 0.1 and about 0.4 mm.

A fifteenth aspect can include a method of cleaning a surface of any of the ninth aspect to the fourteenth aspect, wherein a height of the base is between about 3 and about 5 mm.

A sixteenth aspect can include a method of cleaning a surface of any of the ninth aspect to the fifteenth aspect, wherein the base is formed from a hydrophilic material.

A seventeenth aspect can include a method of cleaning a surface of any of the ninth aspect to the sixteenth aspect, wherein the device is 3D printed.

In an eighteenth aspect, a self-cleaning device comprises: a hydrophobic surface; an internal chamber in fluid communication with the hydrophobic surface for collecting a fluid comprising one or more particles therein; and at least one capillary for communicating the internal chamber with the hydrophobic surface for the fluid to travel from the internal chamber to the hydrophobic surface while substantially all the one or more particles remain in the internal chamber.

A nineteenth aspect can include the self-cleaning device of the eighteenth aspect, wherein: the hydrophobic surface is sloped with respect to horizontal and forms one or more steps to express a textured surface; the internal chamber is formed in a triangular prism subunit positioned underneath the hydrophobic surface; and the fluid comprises a liquid.

A twentieth aspect can include the self-cleaning device of the eighteenth or nineteenth aspect, further comprising a plurality of triangular prism subunits wherein each subunit is defined by at least one side channel.

For purposes of the disclosure herein, the term "comprising" includes "consisting" or "consisting essentially of." Further, for purposes of the disclosure herein, the term "including" includes "comprising," "consisting," or "consisting essentially of."

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application.

The disclosures of all patents, patent applications, and publications cited herein are hereby incorporated by reference, to the extent that they provide exemplary, procedural or other details supplementary to those set forth herein.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. As used herein, the term "and/or" can mean one, some, or all elements depicted in a list. As an example, "A and/or B" can mean A, B, or a combination of A and B. Use of broader terms such as comprises, includes, having, etc. should be understood to provide support for narrower terms such as consisting of, consisting essentially of, comprised substantially of, etc.

What is claimed is:

1. A self-cleaning device comprising:
   a base;
   a plurality of channels formed in a first surface of the base, wherein the plurality of channels divides the first surface of the base into a plurality of sections;
   a plurality of cavities formed within the base, where each cavity of the plurality of cavities is disposed adjacent a corresponding section of the plurality of sections, wherein the plurality of channels is configured to direct a fluid from the first surface into the plurality of cavities, and wherein the plurality of cavities is hydrophilic; and
   one or more capillary channels formed between the first surface of the base on the corresponding section and a corresponding cavity,
   wherein a surface of each section of the plurality of sections comprises a textured surface, and
   wherein a surface of each section of the plurality of sections is hydrophobic.

2. The self-cleaning device of claim 1, wherein each of the plurality of channels has a height in a range of between 1 mm and 2 mm.

3. The self-cleaning device of claim 1, wherein a diameter of each of the plurality of channels is between 0.1 mm and 0.4 mm.

4. The self-cleaning device of claim 1, wherein a height of the base is between 3 mm and 5 mm.

5. The self-cleaning device of claim 1, wherein the base is formed from a hydrophilic material.

6. The self-cleaning device of claim 1, wherein the self-cleaning device is 3D printed.

7. The self-cleaning device of claim 1, wherein each of the plurality of channels has a height in a range of between 1 mm and 2 mm, wherein a diameter of each of the plurality of channels is between 0.1 mm and 0.4 mm, and wherein a height of the base is between 3 mm and 5 mm.

8. The self-cleaning device of claim 1, wherein the textured surface forms a fingerprint pattern.

9. A self-cleaning device comprising:
   a textured, hydrophobic surface;
   a hydrophilic internal chamber in fluid communication with the hydrophobic surface for collecting a fluid comprising one or more particles therein; and
   at least one hydrophilic capillary for communicating the internal chamber with the hydrophobic surface for the fluid to travel from the internal chamber to the hydrophobic surface while substantially all of the one or more particles remain in the internal chamber,
   wherein:
   the hydrophobic surface is sloped with respect to horizontal and forms one or more steps to express the textured surface;
   the internal chamber is formed in a triangular prism subunit positioned underneath the hydrophobic surface; and
   the fluid comprises a liquid.

10. The self-cleaning device of claim 9, further comprising a plurality of triangular prism subunits wherein each subunit is defined by at least one side channel.

* * * * *